United States Patent [19]
Klasna

[11] 3,941,420
[45] Mar. 2, 1976

[54] DUMPING APPARATUS FOR COMBINES
[76] Inventor: Harold D. Klasna, Spencer, Nebr. 68777
[22] Filed: Sept. 16, 1974
[21] Appl. No.: 506,301

[52] U.S. Cl. .................................................. 298/26
[51] Int. Cl.² ......................................... A01D 90/10
[58] Field of Search .......... 298/26, 29, 30; 222/508; 239/651

[56] References Cited
UNITED STATES PATENTS
1,340,798  5/1920  Scott................................. 298/26 X
3,599,844  8/1971  Dickson............................ 298/26 X Primary Examiner—Robert J. Spar
Assistant Examiner—George F. Abraham
Attorney, Agent, or Firm—Zarley, McKee, Thomte & Voorhees

[57] ABSTRACT
A dumping apparatus for combines for collecting threshed material thereon and being adapted to automatically dump the threshed material therefrom when a predetermined weight is accumulated thereon. The apparatus comprises a bottom wall member which is pivotally mounted on the combine below the threshed material discharge opening. The bottom wall member has a pair of upstanding wall members at its opposite sides and has a plurality of spaced apart tine members secured thereto and extending rearwardly therefrom. The forward end of the bottom wall member has a narrower width than the rearward end thereof to aid the threshed material in moving therefrom when the bottom wall member moves from its normally disposed horizontal position to its dumping position. The means for mounting the bottom wall member on the combine is rearwardly and forwardly adjustable relative to the bottom wall member so that the size of the loads or piles may be selectively varied. A gate means is mounted on the combine above the rearward end of the bottom wall memeber to permit larger loads to be accommodated on the bottom wall member. The gate includes a lower hinge portion which permits the gate to open up when the apparatus is dumping.

8 Claims, 5 Drawing Figures

DUMPING APPARATUS FOR COMBINES

BACKGROUND OF THE INVENTION

This invention relates to a combine dumping apparatus and more particularly to a dumping apparatus which automatically dumps when a predetermined load of threshed material has accumulated thereon and which automatically returns to its normal position after the material has been dumped therefrom.

Ordinarily, combines or the like include a straw or threshed material spreader apparatus at the rearward end thereof to spread the threshed material over a wide area as it is being discharged from the combine. In recent years, it has been found that it is desirable to collect the threshed material in piles or the like so that the threshed material can be collected and fed to livestock. Many dumping apparatuses have been substituted for the straw speader apparatuses and ordinarily involve elaborate structure which is difficult to install and which is costly.

Therefore, it is a principal object of the invention to provide an improved combine dumping apparatus.

A further object of the invention is to provide a dumping apparatus for a combine which is easy to install and which is economical of manufacture.

A further object of the invention is to provide a dumping apparatus for a combine having means thereon for selecting the size of the load which will be accumulated thereon.

A further object of the invention is to provide a dumping apparatus for a combine including a pivotal gate means which permits larger loads of threshed material to be accumulated on the dumping apparatus.

A further object of the invention is to provide a dumping apparatus for a combine wherein the forward end of the apparatus has a narrower width than the rearward end thereof to facilitate the material dumping therefrom.

A further object of the invention is to provide a dumping apparatus for a combine which is durable in use.

These and other objects will be apparent to those skilled in the art.

BRIEF DESCRIPTION OF THE DRAWINGS

This invention consists in the construction, arrangements and combination of the various parts of the device, whereby the objects contemplated are attained as hereinafter more full set forth, specifically pointed out in the claims, and illustrated in the accompanying drawings, in which:

DESCRIPTION OF THE PREFERRED EMBODIMENT

Figure 1:
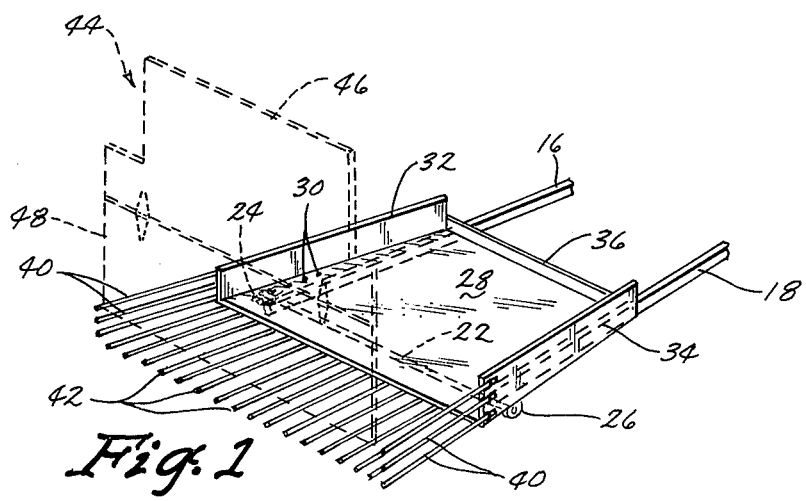
FIG. 1 is a perspective view of the apparatus.

The numeral 10 refers generally to the dumping apparatus of this invention which is adapted to be positioned or mounted on the combine 12. Combine 12 includes a shroud or housing 14 at the rearward end thereof through which the threshed material is discharged.

A pair of spaced apart support arms 16 and 18 are secured to the frame of the combine and extend rearwardly therefrom beneath the discharge opening 20 formed in the shroud 14. A shaft 22 is secured to the rearward ends of the support arms 16 and 18 and extends therebetween as illustrated in the drawings. The opposite ends of the shaft 22 are rotatably mounted in bearing elements 24 and 26.

A bottom wall member or pan 28 is selectively adjustably secured to the bearing elements 24 and 26 by means of bolts 30. As seen in the drawings, bottom wall member 28 may be selectively moved forwardly or rearwardly relative to the bearing elements 24 and 26 to permit various sizes of loads to be accommodated thereon as will be described in more detail hereinafter. Side walls 32 and 34 extend upwardly from the sides of the bottom wall member 28 while a front wall 36 extends upwardly from the forward end of the bottom wall member 28. A plurality of spaced apart tine elements are secured to and extend rearwardly from side wall 32 while a plurality of tine elements 40 are secured to and extend rearwardly from the side wall 34. A plurality of tine elements 42 extend rearwardly from the rearward end of bottom wall member 28 in a spaced apart relationship.

The numeral 44 refers to a gate means which is positioned above the rearward end of the tine elements 42 as seen in the drawings. Gate means 44 comprises an upper gate portion 46 which extends upwardly into the discharge opening 20 of the shroud 14 and a lower gate portion 48 hingedly or pivotally secured to the lower end of upper gate portion 46.

The normal method of operation is as follows. The bottom wall member 28 is normally in the substantially horizontally disposed position illustrated in FIG. 1 and the gate means 44 is normally in the substantially vertically disposed position illustrated in FIG. 1. As the combine moves through the field, the threshed material is discharged through the discharge opening 20 onto the bottom wall member 28. The gate means 44 permits larger loads to accumulate on the bottom wall member 28 since the gate means tends to cause the material to build up on the bottom wall member 28. When sufficient material has accumulated on the bottom wall member 28, the weight of the material positioned rearwardly of the pivotal axis of the shaft 22 will be greater than the amount of the weight of the material forwardly of the shaft 22 which will cause the bottom wall member 28 to automatically pivotally move to the dumping position illustrated in FIG. 3. The lower gate portion 48 pivots rearwardly as the material is discharged from the bottom wall member 28 to facilitate the discharge of material therefrom. The fact that the forward end of the bottom wall member 28 has a narrower width than the rearward end thereof permits the material to easily slide therefrom so it will not become wedged thereon.

Figures 2, 3:
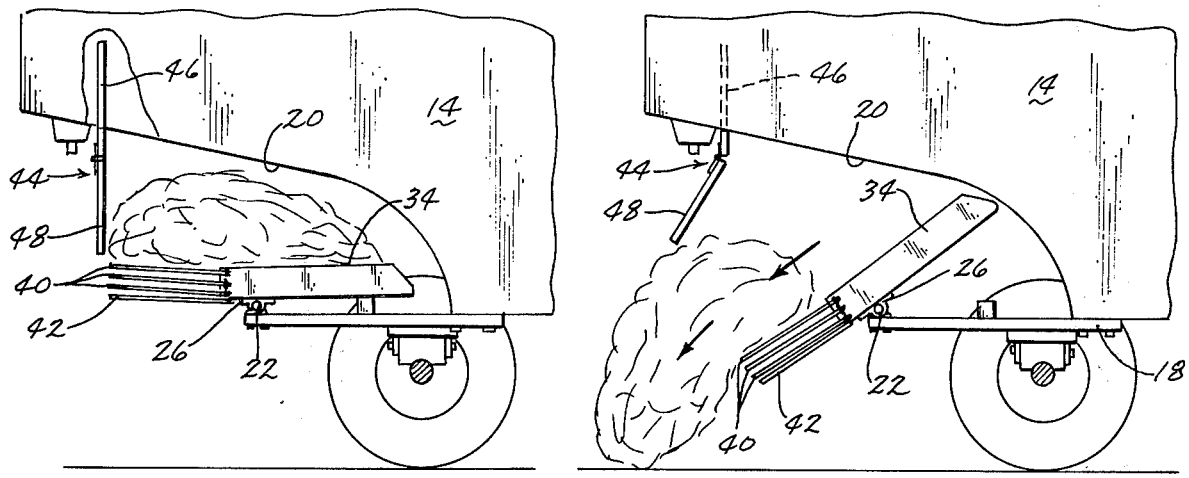
FIG. 2 is a side view of the combine having the apparatus of this invention mounted thereon.
FIG. 3 is a view similar to FIG. 2 except that the apparatus is shown in its dumped position.
Figures 4, 5:
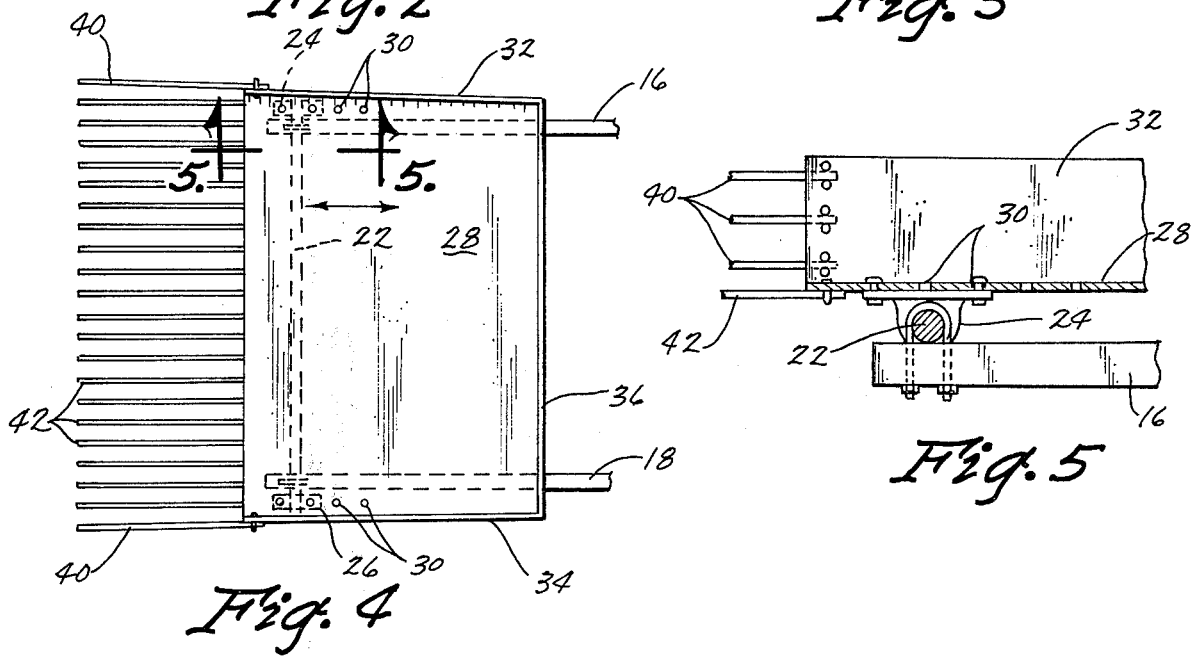
FIG. 4 is a top view of the bottom wall member of the apparatus.
FIG. 5 is a sectional view as seen on lines 5 — 5 of FIG. 2.

After the material has fallen from the inclined bottom wall member 28, the weight of the apparatus causes the bottom wall member 28 to automatically return to its normal horizontally disposed position illustrated in FIG. 2. The threshed material again accumulates on the member 28 until the weight of the material rearwardly of the shaft 22 is sufficiently greater than the weight of the material forwardly of the shaft 22 to cause the member 28 to again dump. As previously stated, bottom wall member 28 may be selectively moved rearwardly or forwardly relative to the shaft 22 to permit various predetermined sizes of the loads to be selected. In other words, if bottom wall member 28 is selectively moved forwardly relative to shaft 22, a larger load will accumulate on the member 28 prior to it moving to its dumping position. Conversely, if bottom wall member 28 is selectively moved rearwardly relative to the shaft 22, the member 28 will move to its dumping position upon a lighter load accumulating thereon.

Thus it can be seen that an extremely simple but yet efficient dumping apparatus has been provided for a combine which permits the threshed material to be accumulated in piles or dumps. The apparatus of this invention insures that the threshed material will automatically dump in an efficient manner. Thus it can be seen that the invention accomplishes at least all of its stated objectives.

I claim:

1. In combination with a combine having a threshed material discharge opening at its rearward end, comprising,
 a threshed material dumping apparatus mounted on the rearward end of the combine adjacent said discharge opening and adapted to receive threshed material therein,
 said dumping apparatus comprising a substantially horizontally disposed bottom wall member pivotally secured to said combine about a horizontal axis so that said bottom wall member may pivot from its normal substantially horizontally disposed position to a dumping position,
 said bottom wall member having rearward and forward ends,
 mounting means pivotally mounting said bottom wall member to said combine,
 said mounting means being positioned intermediate the forward and rearward ends of said bottom wall member whereby the bottom wall member is normally positioned in its substantially horizontally disposed position, said bottom wall member automatically moving to its dumping position when the threshed material accumulates thereon to a predetermined load, the position of said mounting means relative to said bottom wall member causing said bottom wall member to automatically return to its horizontally disposed position after moving to its dumping position.

2. The combination of claim 1 wherein said bottom wall member has opposite sides and wherein an upstanding side wall extends upwardly from opposite sides of said bottom wall member, and a plurality of spaced apart tines secured to the rearward end of said bottom wall member and extending rearwardly therefrom, the rearward end of said dumping apparatus being substantially flush with the rearward end of said combine.

3. In combination with a combine having a threshed material discharge opening at its rearward end, comprising,
 a threshed material dumping apparatus mounted on the rearward end of the combine adjacent said discharge opening and adapted to receive threshed material therein,
 said dumping apparatus comprising a substantially horizontally disposed bottom wall member pivotally secured to said combine about a horizontal axis so that said bottom wall member may pivot from its normal substantially horizontally disposed position to a dumping position,
 mounting means pivotally mounting said bottom wall member to cause said bottom wall member to automatically return to its horizontally disposed position after moving to its dumping position,
 said bottom wall member having rearward and forward ends,
 and a gate means pivotally mounted on said combine, about a horizontal axis, above the rearward end of said bottom wall member, said gate means normally being in a closed position relative to said bottom wall member and automatically pivotally moving to an open position as said bottom wall member moves to its dumping position.

4. The combination of claim 3 wherein said bottom wall member has opposite sides, an upstanding wall means extending upwardly from the opposite sides of said bottom wall member, said forward end of said bottom wall member having a narrower width than the rearward end thereof to aid in dumping the threshed material therefrom.

5. The combination of claim 3 wherein said bottom wall member has rearward and forward ends and wherein said mounting means is selectively connected to said bottom wall member in a rearwardly and forwardly relationship to said bottom wall member to permit the larger or smaller loads to be accommodated thereon prior to the weight of the threshed material thereon causing said bottom wall member to move to its dumping position.

6. The combination of claim 3 wherein said gate means is normally substantially vertically disposed in a plane transverse to the direction of travel of the combine.

7. The combination of claim 6 wherein said gate means has a lower edge which is spaced above said bottom wall member.

8. The combination of claim 7 wherein said gate means comprises an upstanding upper gate portion extending upwardly into said discharge opening and a lower gate portion pivotally secured about a horizontal axis to the lower end of said upper gate portion.

* * * * *